Sept. 20, 1960 R. L. MILLER 2,953,644
WAVE TRANSMISSION SYSTEM
Filed Oct. 4, 1956 2 Sheets-Sheet 1

INVENTOR
R. L. MILLER
BY Harry C. Hart
ATTORNEY

Sept. 20, 1960 R. L. MILLER 2,953,644
WAVE TRANSMISSION SYSTEM
Filed Oct. 4, 1956 2 Sheets-Sheet 2

INVENTOR
R. L. MILLER
BY Harry C. Hart
ATTORNEY

United States Patent Office 2,953,644
Patented Sept. 20, 1960

2,953,644

WAVE TRANSMISSION SYSTEM

Ralph L. Miller, Chatham, N.J., assignor to Bell Telephone Laboratories, Incorporated, New York, N.Y., a corporation of New York Filed Oct. 4, 1956, Ser. No. 613,886

13 Claims. (Cl. 179—15.55)

This invention relates to the transmission, by indirect means, of information-bearing waves such as speech waves, and has for its principal objects the reduction of the vulnerability of such waves to noise and interference gathered in the course of transmission and the reduction of the frequency band required for such transmission.

It is well known that a speech wave may be coded into groups of two-valued pulses, and that these may be transmitted to a receiver station and there decoded to recover the original speech. Because of its two-valued character the pulse train can be fully regenerated, as often as desired, thus to remove all the distortion which it may have gathered, for example due to noisy or interferent conditions in the transmission medium. Systems of this character employ apparatus of much complexity. Moreover, transmission of the pulse train requires a channel which is as wide, on the frequency scale, as is required for direct transmission of the original speech, and generally wider.

Other systems are known in which a speech wave is first broken into a number of contiguous frequency bands, individual low frequency control signals are derived representative of the energies in the several bands and transmitted to a receiver station where they control the operation of apparatus which synthesizes artificial speech. Because of the low frequency character of the control signals, they together require for transmission only a relatively narrow frequency band. Systems of this character, termed vocoder systems, employ complex apparatus and their control signals are vulnerable to noise.

The present invention provides a simplified, indirect transmission system which offers advantages both from the standpoint of noise immunity and from the standpoint of frequency band reduction. It stems from the realization that a speech wave may advantageously be treated as a product of two factors: a phase or frequency factor and an amplitude or envelope factor; and that signals representative of these two factors may together be less vulnerable to noise, and may require less frequency space for their transmission, than the original speech wave. Accordingly, the wave to be transmitted is applied to two paths, connected in parallel. In one of these paths a clipper derives a sequence of flat-topped pulses of varying durations and of alternately opposite polarities: a wave in which the axis crossing instants or zeros of the original wave on the time scale are preserved, but all information as to amplitudes is discarded. In the other path a rectifier preserves the amplitude information of the original wave, discarding its phase and frequency information. This latter signal is inherently of low frequency and requires only a narrow transmission band. Such a narrow channel improves the signal-to-noise ratio. The signal may be rendered still more immune to noise by amplification and addition of a bias. The former signal, termed the phase signal, partakes of the nature of a pulse train and is therefore inherently immune to noise of amplitude less than one-half its excursion. It may therefore be regenerated as often as desired, and so, in effect, be immune to noise of practically any magnitude. While, without further modification it is a wide band signal, a relatively narrow band control signal may be derived to represent it. Such a control signal may take various forms. In one form it may be a simple direct current whose magnitude is at all times proportional to the frequency of the phase signal from which it is derived, thus varying much more slowly than the phase signal. In another form it may be a modified phase signal derived from the original phase signal by a frequency division process and therefore comprising similar flat-topped pulses of like amplitudes, positive or negative, and thus the same immunity to noise. This derived phase signal occupies a narrower band than does the original phase signal.

As with the amplitude control signal, the phase control signal of the first form may be rendered substantially immune to noise by amplification and addition of a bias.

At the receiver station the phase signal is regenerated, e.g., by applying it to control the switching of a trigger device such as a multivibrator. The output of this unit now substantially duplicates the phase signal as originally derived, the effects of noise gathered in transmission being greatly reduced. Finally the envelope signal modulates this output in amplitude to produce an approximate replica of the original speech wave.

It is a consequence of this approach to the transmission problem that the apparatus by which it is instrumented is much simpler than a conventional noise-immune pulse transmission system and much simpler, too, than a conventional vocoder system.

At the price of some increase in the complexity of the apparatus, the invention as described above may be applied to that part only of an original signal which falls within a restricted band of frequencies. In the case of signals of certain types, notably telephone signals, the complexity of each of the component signals to be analyzed is thus reduced considerably more than in proportion to the bandwidth reduction of the original signal, and the band required for transmission of the phase signal derived for each such subband is similarly reduced. A group of such systems, one for each of a group of contiguous frequency bands, may then be employed together for the indirect transmission of the original signal. At the receiver station, the outputs of the several modulators are then combined to form a composite signal suitable for application to a sound reproducer.

The clipping operation inevitably introduces modulation products which, if not removed, would constitute distortion in the reconstructed speech. It is difficult to remove these modulation products by filtering alone for the reason that some of them may lie within the frequency band of the speech itself. Therefore it is preferred first to shift the speech on the frequency scale above the band which it normally occupies, and to apply the clipping operation, the envelope detection, the transmission and the reconstitution, not to the original speech wave, but to the frequency-shifted wave. After the latter has been reconstituted at the receiver it may be restored to its original position on the frequency scale by a heterodyne detector.

The invention will be fully apprehended from the following detailed description of preferred embodiments taken in connection with the appended drawings in which.

Figure 1:
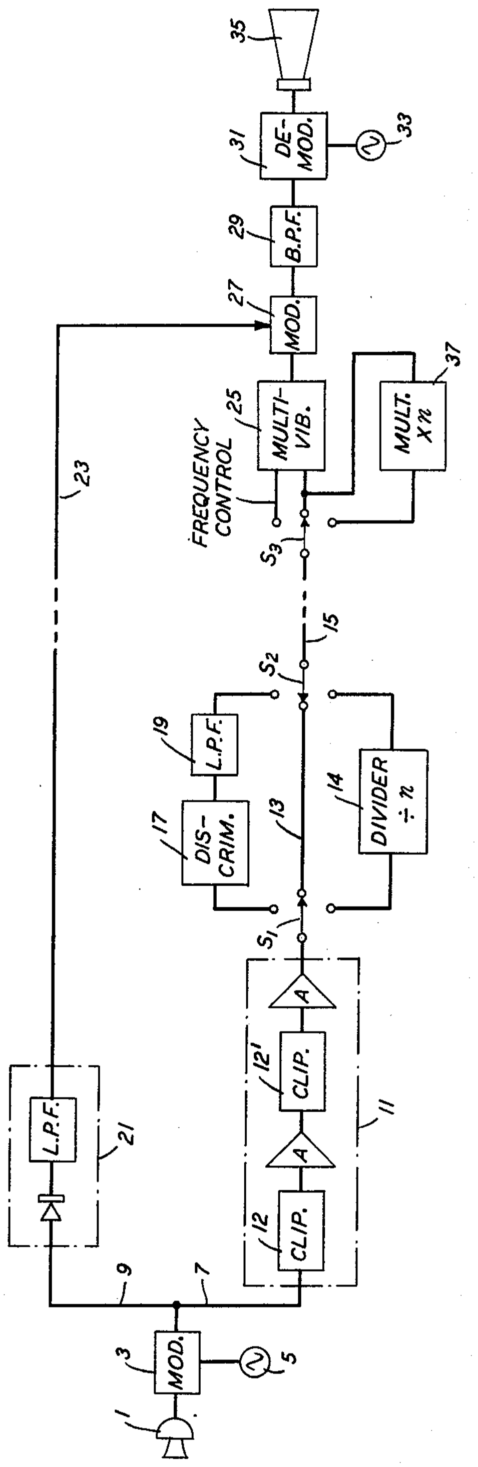
Fig. 1 is a block schematic diagram illustrating the invention in one of its simpler forms.

Referring now to Fig. 1 a complex message wave originating for example, in a microphone 1, is first raised on the frequency scale as by a heterodyne modulator 3, supplied with energy of a suitable high frequency from an oscillator 5. In the case of a voice message of which the significant component frequencies occupy the range 0–4000 cycles per second, a suitable frequency for the oscillator 5 is 8000 or 10000 cycles per second. The resulting band-shifted message wave is then led in parallel into two paths 7, 9, of which the lower one 7 may be termed the "phase" or "frequency" path while the upper one 9 is termed the "amplitude" or "envelope" path. A principal element of the lower path is a phase detector 11. Its function is to identify each axis crossing or zero value of the wave applied to it and to discard other information-bearing features such as amplitude variations. In its simplest form it may comprise merely a clipper 12, though as a practical matter it is preferred to employ a plurality 12, 12' of such clippers connected in tandem, with an amplifier between each one and the next. The output of this phase detector 11 is a sequence of flat-topped pulses, of positive and negative polarities in alternation, and of uniform amplitudes which are independent of the amplitude of the input wave, depending only on the clipping operation. This sequence of flat-topped pulses is termed a phase signal.

With switches $S_1$, $S_2$, thrown to their center positions this phase signal is transmitted without further modification, over a conductor 13 and a transmission channel 15 to a receiver station. With the switches thrown to their upper positions the phase signal is applied to a discriminator 17 which may be conventional and whose operation is to deliver at its output terminal a signal whose amplitude is proportional to the frequency of its input signal. It thus converts frequency, i.e., the rate of change of the phase signal, into voltage level or current magnitude, and so, when the frequency changes the discriminator output changes also. Under some conditions of input signal these changes may be rapid while under others they may be comparatively slow. In the latter event a low-pass filter 19 may advantageously be interposed in tandem with the discriminator 17 to pass only such components of the phase control signal as are required, eliminating the others.

With the switches $S_1$, $S_2$ thrown to their lower positions a frequency divider 14 is interposed in the phase signal path. It acts to divide the rate at which the phase signal passes through its zero values by a constant factor such as two. This results in a modified phase signal which, like the original phase signal, comprises similar flat-topped pulses of like amplitudes, positive or negative. Its axis crossings are reduced in number by the division factor. Thus if the division factor be two the modified phase signal contains only half as many axis crossings as does the original phase signal. However, each axis crossing of the modified phase signal coincides in time with an axis crossing of the original phase signal. Hence the information contained in the sequence of axis crossings, and hence in the original phase signal, is to a large extent preserved, as is also a precise measure of frequency. By virtue of the large amplitude, flat-topped character of the modified phase signal wave, immunity to noise is also preserved.

In the upper path 9, an envelope detector 21 operates to preserve that part of the information in the original wave which appears as variations of its amplitude or envelope. It may conveniently comprise a rectifier followed by a low-pass filter. This filter may be proportioned to have a time constant of the order of 1/300 second or so, thus to pass components of pitch and syllabic frequencies and to block components of other frequencies.

The phase signal itself, or the derived phase control signal as the case may be, and the envelope signal are now transmitted by any suitable means and over a medium 15, 23, e.g., a noisy medium, to a receiver station. At the receiver station a trigger circuit is provided, for example a multivibrator 25 whose output consists of a signal of uniform arbitrary excursion, positive or negative in dependence on which one of two conditions, usually known as an Off condition and an On condition, it momentarily occupies. The phase signal is applied to this multivibrator 25 in well known fashion and, with each change in the polarity of the phase signal, it drives the multivibrator from one of its two conditions to the other. Thus the multivibrator output signal is a substantial replica of the original phase signal and therefore accurately repeats each zero or axis crossing of the original wave. Since, moreover, the multivibrator 25, by virtue of its threshold behavior and trigger action acts to regenerate the phase signal, the latter is cleared of all amplitude degradation which it may have accumulated in the course of transmission over a medium characterized by noise, interference or other source of distortion.

This repeated phase signal is now applied to one input point of a modulator 27 to whose other input point the envelope signal is applied. The modulator acts to impress the output of the multivibrator 25 with the speech envelope and thus approximately to recover the original output wave of the heterodyne modulator 3. After removal of modulation products lying outside the band of interest by a filter 29, this wave may now be restored to its original position on the frequency scale by a demodulator 31, supplied with carrier oscillations from a source 33. The output of the demodulator 31 may now be applied to a reproducer 35.

It is to be noted that, with the switches $S_1$, $S_2$, in their center positions, each axis crossing or zero of the original wave is exactly preserved throughout transmission and reconstruction. That is to say, phase and frequency are fully preserved. At the price of some departure from this exact relation, which in many cases is not serious, substantial economies in the bandwidth required for the transmission of the phase signal may be effected by throwing the switches $S_1$, $S_2$ at the transmitter station into their upper positions, thus interposing the discriminator 17 and its low-pass filter 19 in tandem with the phase detector 11. This substitutes a phase control signal on the transmission line 15 for the phase signal itself. As described above, the phase control signal may occupy a much narrower frequency band than the phase signal itself. With this change a corresponding change is made at the receiver station by throwing the switch $S_3$ to its upper position, thus applying the phase control signal to a frequency-control terminal of the multivibrator 25 which, with a minor readjustment of the magnitudes of its elements, oscillates continuously at a frequency determined by the control signal instead of being locked in step with the phase signal as before. With this arrangement the exact instants of the axis crossings of the original wave are no longer preserved. However, the frequency of repetition of such axis crossings may be preserved with all the accuracy necessary for the satisfactory reconstruction of speech.

A multivibrator which is adjusted to switch by itself from each of its two conditions of operation to the other and at a rate determined by a control signal applied to it is a familiar component of vocoder speech compression systems as illustrated, for example, in H. W. Dudley 2,151,091, March 21, 1939. Refinements of apparatus of this character are disclosed in Reisz 2,522,539, September 19, 1950. It is well known that such a multivibrator may, if preferred, be locked in step with a signal such as the present phase signal.

With the switches $S_1$, $S_2$ thrown to their lower positions, thus to supply to the receiver station a modified phase signal whose frequency is always a preassigned fraction, e.g., one-half, of that of the original phase signal the half-frequency may advantageously be restored substantially to its original form by throwing the switch $S_3$ to its lower position, thus applying the incoming signal to a multiplier 37 which increases every frequency by the same factor as was employed at the transmitter station for frequency reduction by the divider 14. The output of this multiplier 37 now comprises, once more, a train of flat-topped pulses, positive or negative, having always the same frequency as the original phase signal and nearly the same phase. This may be applied to the trigger terminal of the multivibrator 25, there to control it in the fashion described above for the original phase signal.

Figure 3:
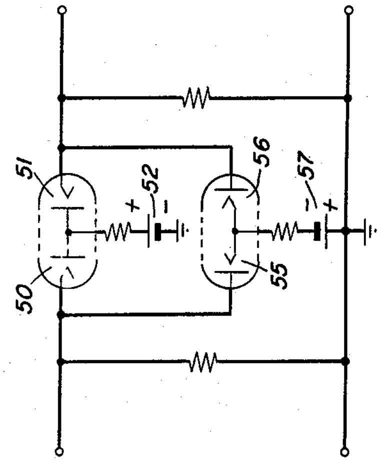
Fig. 3 is a schematic circuit diagram showing details of the clipper of Fig. 1.

The clipper 12, or the clippers 12, 12' if more than one are employed, may also be of well known construction. For example, each such clipper may comprise a first pair of diodes 50, 51, connected anode to anode and biased in one sense as by a battery 52, in parallel with a second pair of diodes 55, 56 connected cathode to cathode and biased in the opposite sense as by a battery 57. Such a combination is illustrated in Fig. 3.

Figure 2:
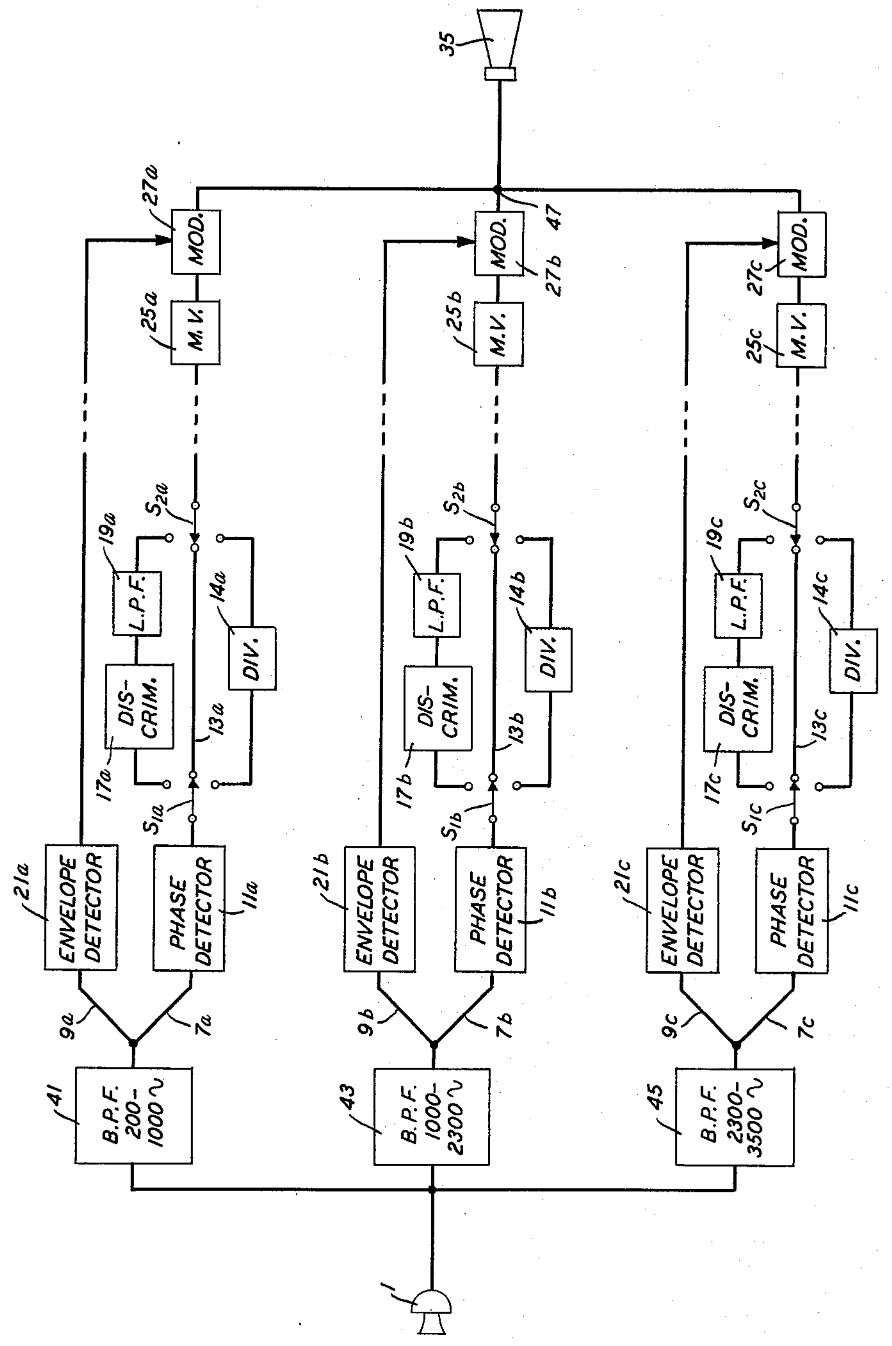
Fig. 2 is a block schematic diagram showing an extension of the apparatus of Fig. 1.

The invention may be applied individually to each of a plurality of frequency subbands which together embrace the entire frequency range occupied by the original signal. In Fig. 2, which shows a system of this character, the band of the original signal is first broken into three contiguous subbands as by band-pass filters 41, 43, 45 and the output of each such filter is in turn applied to two paths of which the upper one is an envelope path and the lower one a phase path. Each envelope path and each phase path of Fig. 2 may be identical with the envelope path and the phase path, respectively, of Fig. 1, and may comprise the same three alternatives, thus either to transmit the phase signal directly to the receiver station, there to control each excursion of the multivibrator or other trigger circuit as described above, or to transmit, instead, a control signal there to control the multivibrator oscillation frequency. The three resulting amplitude-modulated phase signal outputs may then be combined as by addition at a point 47 for application to a sound reproducer 35. The circuit components are identified by the same reference numerals as in Fig. 1, with the subscript *a*, *b*, or *c* to indicate the first, second and third subbands, respectively.

Various modifications of detail and various other uses of the invention will suggest themselves to those skilled in the art. For example, the initial heterodyne modulator 3 and the final demodulator 31 may be omitted from Fig. 1 thus applying the invention to the original speech wave without frequency shift. Likewise, a modulator and a demodulator, driven by carrier sources as in Fig. 1, may be combined with the circuit of Fig. 5, with appropriate changes in the passband frequencies of the filters 41, 43 and 45.

What is claimed is:

1. Wave transmission apparatus which comprises, in combination, a transmitter station, a source of a coherent message wave located at said station, the wave of said source being characterized by variations of amplitude and by zeros that are irregularly spaced apart in time, two energy paths connected in parallel to said source, means in one of said paths for deriving a phase signal of which the zero values correspond in their instants of occurrence with and only with those of the wave and for discarding amplitude characteristics of said wave, means in the other path for deriving an envelope signal representative of the amplitude characteristics of said wave and for discarding its frequency characteristics, a receiver station, means for transmitting said signals individually to said receiver station and, at said receiver station, an oscillator under control of said phase signal for regenerating said phase signal, and means for modulating the output of said oscillator in amplitude under control of said envelope signal.

2. Apparatus as defined in claim 1 wherein said phase signal deriving means comprises an amplitude clipper.

3. Apparatus as defined in claim 1 wherein said phase signal deriving means comprises a plurality of amplitude clippers intercoupled in tandem by way of an amplifier.

4. Apparatus as defined in claim 1 wherein said oscillator is a multivibrator.

5. In combination with apparatus as defined in claim 4, means for locking said multivibrator in step with incoming phase signals.

6. In combination with apparatus as defined in claim 1, a discriminator connected in tandem with said phase signal deriving means for delivering a signal of which the magnitude is proportional to the rate of recurrence of the zero values of said phase signal.

7. In combination with apparatus as defined in claim 6, means controlled by said last-named signal for adjusting the frequency of oscillation of said multivibrator.

8. In combination with apparatus as defined in claim 1, means for dividing the frequency of said phase signal by a preassigned integral factor to derive a modified phase signal.

9. In combination with apparatus as defined in claim 8, means for multiplying the frequency of said modified phase signal by said integral factor, thereby to recover said original phase signal.

10. Wave transmission apparatus which comprises, in combination, a transmitter station, a coherent message wave source located at said station, a plurality of filters each having an input terminal and an output terminal, said input terminals being connected in parallel to said source, said filters being proportioned to divide the energy of said source into a plurality of contiguous subbands which together embrace the frequency band occupied by the wave of said source, a pair of energy paths connected in parallel to each of said filters, a phase detector in one member of each pair for deriving a phase signal of which the zero values correspond in their instants of occurrence with those of the output wave of said filter and for discarding amplitude characteristics of said output wave, an envelope detector in the other member of each pair for deriving a signal representative of the amplitude characteristics of the output wave of said filter and for discarding its frequency characteristics, a receiver station, means for transmitting said signals individually to said receiver station, and, at said receiver station, a plurality of oscillators, one of said oscillators being under control of each of said phase signals, means for modulating the output of each of said oscillators in amplitude under control of that one of said amplitude signals which was derived from the same filter, means for combining the outputs of said several oscillators, and means for reproducing said combined outputs.

11. Speech wave transmission apparatus which comprises, in combination, a transmitter station, a speech wave source located at said station, two energy paths connected in parallel to said source, means in one of said paths for deriving a phase signal of which the zero values correspond in their instants of occurrence with and only with those of the speech wave and for discarding amplitude characteristics of said wave, means in the other path for deriving an envelope signal representative of the amplitude characteristics of said speech wave and for discarding its frequency characteristics, a receiver station, means for transmitting said signals individually to said receiver station and, at said receiver station, an oscillator under control of said phase signal for regenerating said phase signal, and means for modulating the output of said oscillator in amplitude under control of said envelope signal.

12. Wave transmission apparatus which comprises, in combination, a transmitter station, a source of a coherent message wave located at said station, the wave of said source being characterized by variations of amplitude and by the zeros that are irregularly spaced apart in time, two energy paths connected in parallel to said source, means in one of said paths for deriving a phase signal of which the zero values correspond in their instants of occurrence with and only with those of the message wave and for discarding amplitude characteristics of said wave, means in the other path for deriving an envelope signal representative of the amplitude characteristics of said message wave and for discarding its frequency characteristics, a receiver station, a broad band transmission channel and a narrow band transmission channel extending from said transmitter station to said receiver station, means for transmitting said phase signal over said broad band channel, means for transmitting said envelope signal over said narrow band channel and, at said receiver station, an oscillator under control of said phase signal for regenerating said phase signal, and means for modulating the output of said oscillator in amplitude under control of said envelope signal.

13. Speech wave transmission apparatus which comprises, in combination, a transmitter station, a speech wave source located at said station, two energy paths connected in parallel to said source, means in one of said paths for deriving a phase signal comprising a sequence of pulses occurring, respectively, at instants of like phase in said speech wave and for discarding amplitude characteristics of said speech wave, means in the other path for deriving an envelope signal representative of the amplitude characteristics of said speech wave and for discarding its frequency characteristics, a receiver station, a broad band transmission channel and a narrow band transmission channel extending from said transmitter station to said receiver station, means for transmitting said phase signal over said broad band channel, means for transmitting said envelope signal over said narrow band channel and, at said receiver station, means under control of said pulse sequence for reproducing the phase changes of said speech wave, and means for amplitude modulating the output of said reproducing means under control of said envelope signal.

References Cited in the file of this patent

UNITED STATES PATENTS

| | | |
|---|---|---|
| 2,113,214 | Luck | Apr. 5, 1938 |
| 2,250,862 | Farrington | July 29, 1941 |
| 2,413,593 | Sziklai | Dec. 31, 1946 |
| 2,462,874 | Labin et al. | Mar. 1, 1949 |
| 2,474,244 | Grieg | June 28, 1949 |
| 2,591,264 | Janssen | Apr. 1, 1952 |
| 2,644,084 | O'Brien | June 30, 1953 |
| 2,686,259 | Koch | Aug. 10, 1954 |

FOREIGN PATENTS

| | | |
|---|---|---|
| 179,317 | Austria | Aug. 10, 1954 |